S. A. BRIGGS.
Heater.
No. 35,294. Patented May 20, 1862.
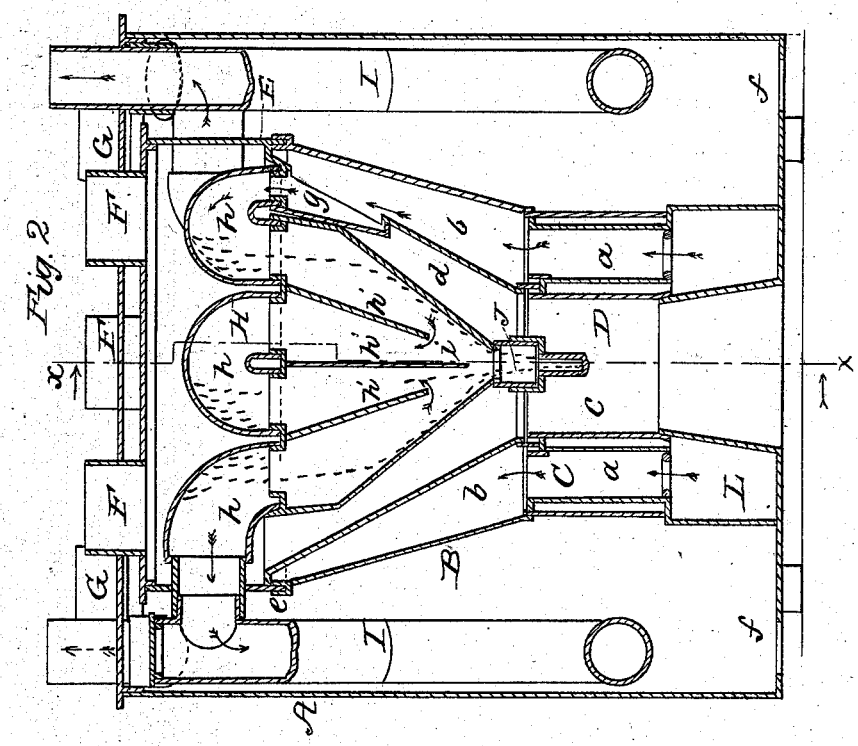
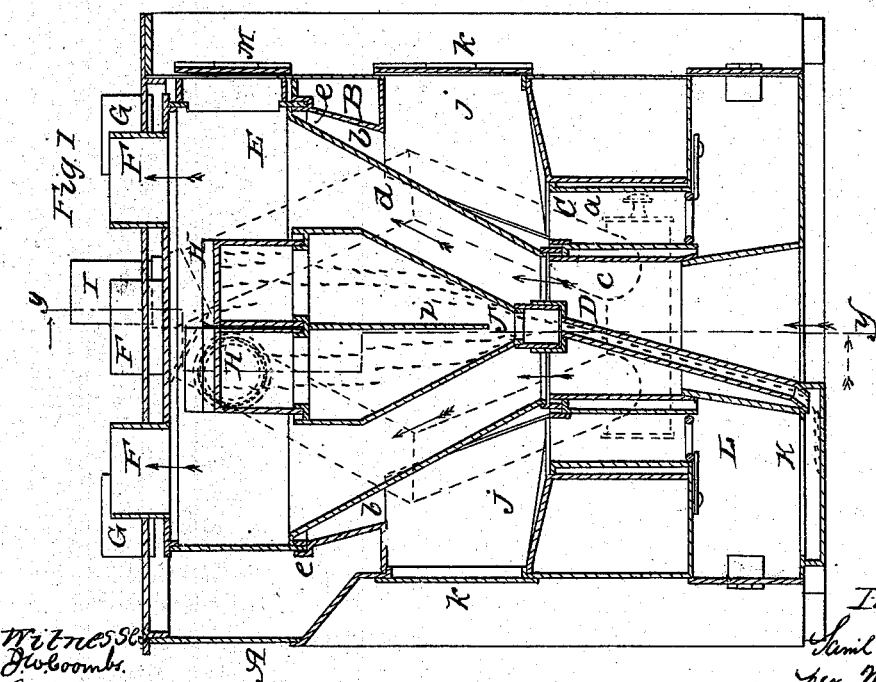

UNITED STATES PATENT OFFICE.

SAMUEL A. BRIGGS, OF PROVIDENCE, RHODE ISLAND.

IMPROVEMENT IN HEATERS.

Specification forming part of Letters Patent No. 35,294, dated May 20, 1862.

*To all whom it may concern:*

Be it known that I, SAMUEL A. BRIGGS, of Providence, in the county of Providence and State of Rhode Island, have invented a new and Improved Air-Heating Furnace; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate corresponding parts in the two figures.

This invention consists in a peculiar manner of constructing the furnace in connection with a central cold-air pipe, and a novel construction and arrangement of flues, whereby economy in fuel is not only obtained, but the flues also rendered self-cleaning.

To enable those skilled in the art to fully understand and construct my invention, I will proceed to describe it.

A represents a wall of masonry, which is built around the furnace to form an outer air-heating chamber, B, and C is the furnace, the lower part, $a$, of which is of cylindrical form, and the upper part, $b$, of inverted conical form, as shown in both figures.

D is a central cold-air pipe, which is fitted within the furnace C. The lower part, $c$, of this pipe is of cylindrical form, while the upper part, $d$, is of inverted conical form, but rather more flaring than the upper part, $b$, of the furnace, in order that the upper ends of the furnace and cold-air pipe may be connected together, as shown at $e$, to form the top of the fire-chamber.

In consequence of the cold-air pipe D being fitted centrally in the furnace, an annular form is given it, and the lower end of said cold-air pipe extends down through the bottom of chamber B, so as to communicate directly with the external air. The lower part of the chamber B also communicates directly with the external air by means of openings $f$, as shown in Fig. 2. On the top of the furnace C there is fitted or placed a drum, E, which is in direct communication with the cold-air pipe D and forms the top thereof, and with which hot-air-conveying pipes F communicate, and G are hot-air-conveying pipes, which communicate with the upper part of the chamber B.

H H are two flues, which are placed horizontally in the drum E, side by side, and communicate with the furnace C by means of openings $g$. The flues H H pass through the side of the drum E at opposite points and communicate with the upper ends of diamond-shaped pipes, I I, (see dotted lines, Fig. 1,) which are in the chamber B, and have their upper ends passing through the top of said chamber and communicate with the flue of the furnace.

Each flue H is formed of curved passages $h$, of which there may be three, (more or less,) and they communicate by means of a spout, J, with a receiver, K, underneath the ash-box L of the furnace, as shown in Fig. 1. These spouts J are provided with plates $h'$, which extend down within it a considerable distance, as shown in Fig. 2, the spout being also provided with a central partition-plate, $i$, which serves to divide the passage-ways of the two flues as shown in Fig. 1.

The furnace C is provided with two feeding-passages, $j\ j$, the doors $k\ k$ of which are at opposite sides of the masonry of chamber B, as also shown in Fig. 1. The drum E may also have a door, M, in it communicating with the external air.

The operation is as follows: When a fire is built in the furnace, the air in pipe D will be rarefied and induce a passage of cold air into it, which is rapidly heated in its upper inverted conical part in consequence of being exposed to a large heating-surface. The upper part of the furnace, owing to its flaring or inverted conical form, causes the heat to spread or expand in a considerable space, which heat is quickly absorbed by the air in the upper part of D, as will be fully understood by referring to Fig. 2. The air in D is also greatly assisted in being heated by the flues H H in the drum E, as considerable heat is radiated by said flues, the passage of the products of combustion through them being indicated by the arrows. The products of combustion in passing through said flues are deprived of all heavy substances—such as soot, &c.—in consequence of the latter falling by their gravity through spout J into the receiver K, the lighter portions—such as gases and smoke—passing down and underneath the plates $h$, and continuing along into the pipes I I and thence into the flue of the furnace. The pipes I I assist in heating the air in B, as some heat is of course radiated from them. The outward radiation of heat from the furnace is absorbed by the air in B, which is admitted through the openings $f$, as previously stated. In case the air in the upper part of D requires to be reduced in temperature, it may be done by opening door M. The heated air is conveyed to the apartments through the pipes F G, previously described.

I do not claim, broadly, a central cold-air pipe placed within an air-heating furnace, for that is an old arrangement; but I do claim as new and desire to secure by Letters Patent—

1. The flues H H, arranged within the drum E, or at the upper part of the cold-air pipe D, and used in connection with the upper inverted conical parts, $b\ d$, of the furnace and cold-air pipe, as and for the purpose specified.

2. In combination, with the flues H H, the spout J, provided with a central partition-plate, $i$, and plates $h'$, and communicating with curved passages $h$ in the flues for the purpose of rendering the same self-cleaning, as set forth.

3. The combination of the furnace C, cold-air pipe D, flanges H H, and pipes I I, arranged, as shown, within the chamber B, for the purpose specified.

SAML. A. BRIGGS.

Witnesses:
 HENRY L. BOWEN,
 PETER DEACON.